United States Patent [19]
Katz

[11] Patent Number: 5,224,153
[45] Date of Patent: * Jun. 29, 1993

[54] VOICE-DATA TELEPHONIC INTERFACE CONTROL SYSTEM

[75] Inventor: Ronald A. Katz, Los Angeles, Calif.

[73] Assignee: First Data Resouces Inc., Omaha, Nebr.

[*] Notice: The portion of the term of this patent subsequent to Dec. 20, 2005 has been disclaimed.

[21] Appl. No.: 680,879

[22] Filed: Apr. 5, 1991

Related U.S. Application Data

[63] Continuation-in-part of Ser. No. 481,403, Feb. 20, 1990, Pat. No. 5,014,298, which is a continuation-in-part of Ser. No. 312,792, Feb. 21, 1989, Pat. No. 5,073,929, which is a continuation-in-part of Ser. No. 194,258, May 16, 1988, Pat. No. 4,845,739, which is a continuation-in-part of Ser. No. 18,244, Feb. 24, 1987, Pat. No. 4,792,968, which is a continuation-in-part of Ser. No. 753,299, Jul. 10, 1985, abandoned.

[51] Int. Cl.$^5$ .................... H04M 11/00; H04M 11/10
[52] U.S. Cl. ........................................ 379/93; 379/97; 379/92; 379/67; 379/88
[58] Field of Search ...................... 379/97, 93, 92, 91, 379/88, 67

[56] References Cited

U.S. PATENT DOCUMENTS

| | | | |
|---|---|---|---|
| 4,320,256 | 3/1982 | Freeman | 379/92 |
| 4,645,873 | 2/1987 | Chomet | 379/93 |
| 4,797,911 | 1/1989 | Szlam et al. | 379/92 |
| 4,894,857 | 1/1990 | Szlam et al. | 379/92 |

Primary Examiner—James L. Dwyer
Assistant Examiner—Stella L. Woo
Attorney, Agent, or Firm—Nilsson, Wurst & Green

[57] ABSTRACT

In an audio-digital telephone interface system, selective operation prompts a caller with oral instructions to provide: digital control signals, digital data signals (numeric) or audio signals. Inbound and outbound operations are involved and inbound callers are qualified as by automatic number identification (ANI) signals and consumable key operation. A data cell is loaded in accordance with an operating program and the resulting data packet is flagged depending on the presence of audio signals. Data packets are returned to storage, as for subsequent addressing to call up, as to process or cue a caller. The illustrative format receives and organizes order data for goods or services or to isolate a subset or a sub-subset of callers.

22 Claims, 3 Drawing Sheets

VOICE-DATA TELEPHONIC INTERFACE CONTROL SYSTEM

BACKGROUND AND SUMMARY OF THE INVENTION

This is a continuation-in-part of U.S. patent application Ser. No. 481,403 filed Feb. 20, 1990 and entitled "Voice-Data Telephonic Control System", issued May 7, 1991 as U.S. Pat. No. 5,014,298 which was a continuation-in-part of U.S. patent application Ser. No. 312,792 filed Feb. 21, 1989 and entitled "Voice-Data Telephonic Control System", issued Dec. 17, 1991 as U.S. Pat. No. 5,073,929, which was a continuation-in-part of U.S. patent application Ser. No. 194,258 filed May 16, 1988 and entitled "Telephonic-Interface Statistical Analysis System", issued Jul. 4, 1989 as U.S. Pat. No. 4,845,739, which was a continuation-in-part of U.S. patent application Ser. No. 018,244 filed Feb. 24, 1987 and entitled "Statistical Analysis System For Use With Public Communication Facility", issued Dec. 20, 1988 as U.S. Pat. No. 4,792,968, which was a continuation-in-part of U.S. patent application Ser. No. 753,299 filed Jul. 10, 1985 and entitled "Statistical Analysis System For Use With Public Communication Facility", now abandoned.

As the use of computer techniques has steadily grown, related telephonic communication techniques also have expanded. In that regard, telephone systems have been developed for effectively transmitting digital data in forms commonly utilized by computer apparatus. At a more personal level, the traditional push buttons of telephone instruments have been utilized to provide digital signals at a remote location for both data and control functions. Consequently, various operations have been performed.

In the typical operation of a telephone instrument as a digital input device, voice messages prompt callers to provide data and control signals by actuating the alphanumeric buttons of a conventional telephone. Detailed forms of such systems have been proposed in association with computers to provide various services, and one such system is disclosed in U.S. Pat. No. 4,792,968 issued Dec. 20, 1989, to Ronald A. Katz from a U.S. patent application Ser. No. 07/018,244 filed Feb. 24, 1987.

Although traditional systems for interfacing an individual person at a telephone terminal with a computer or data processor have been effective, such systems have been somewhat limited in application. In general, the present invention is based on recognizing the need in such systems to accommodate voice signals as to provide recorded audio data, as for subsequent use. Accordingly, the system of the present invention accommodates a caller to identify digital control signals, digital data signals and audio signals, all in an organized format as to accomplish a record for subsequent processing or use.

To consider a specific example, systems have been proposed in the past for interfacing individual telephone terminals with computers, as for sales applications. Individual callers might dial to accomplish a computer interface, then provide ordering data by actuating the telephone terminal buttons to specify goods or services. One such system is disclosed in a co-pending related patent application entitled "Telephone Interface Statistical Analysis System", filed May 16, 1988, and bearing a U.S. patent Ser. No. 07/194,258 (now U.S. Pat. No. 4,845,739) and a related prior application, now U.S. Pat. No. 4,792,968. In the use of such systems, the need is recognized for improved capability regarding audio data.

In general, the present invention comprises a telephone computer interface system accommodating digital and vocal telephonic communication, the system being expanded to accommodate and flag audio data distinct from digital data. In using the disclosed system, either outbound or inbound calling operations attain an interface with a central data processing system. Depending on the course of communication during the interface, various states are implemented for the central system to receive and identify: digital control signals, digital data signals and audio or voice signals. Somewhat conventional operation may involve automated vocal communications to cue the caller and keypad digital communications from the caller. Generally, data received from the caller is set in memory for subsequent use or processing. The data may be addressed as to cue a remote terminal or to isolate a set or subset. Callers may be qualified by automatic number identification (ANI) signals checked against an assigned consumable key number. Thus, the system accommodates flexible control and data accumulation (including cued audio) to accommodate any of various specific interface applications or formats.

BRIEF DESCRIPTION OF THE DRAWINGS

In the drawings, which constitute a part of this specification, an exemplary embodiment exhibiting various objectives and features hereof is set forth. Specifically.

DESCRIPTION OF THE ILLUSTRATIVE EMBODIMENT

As required, a detailed illustrative embodiment of the present invention is disclosed herein. However, physical communication systems, data formats and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
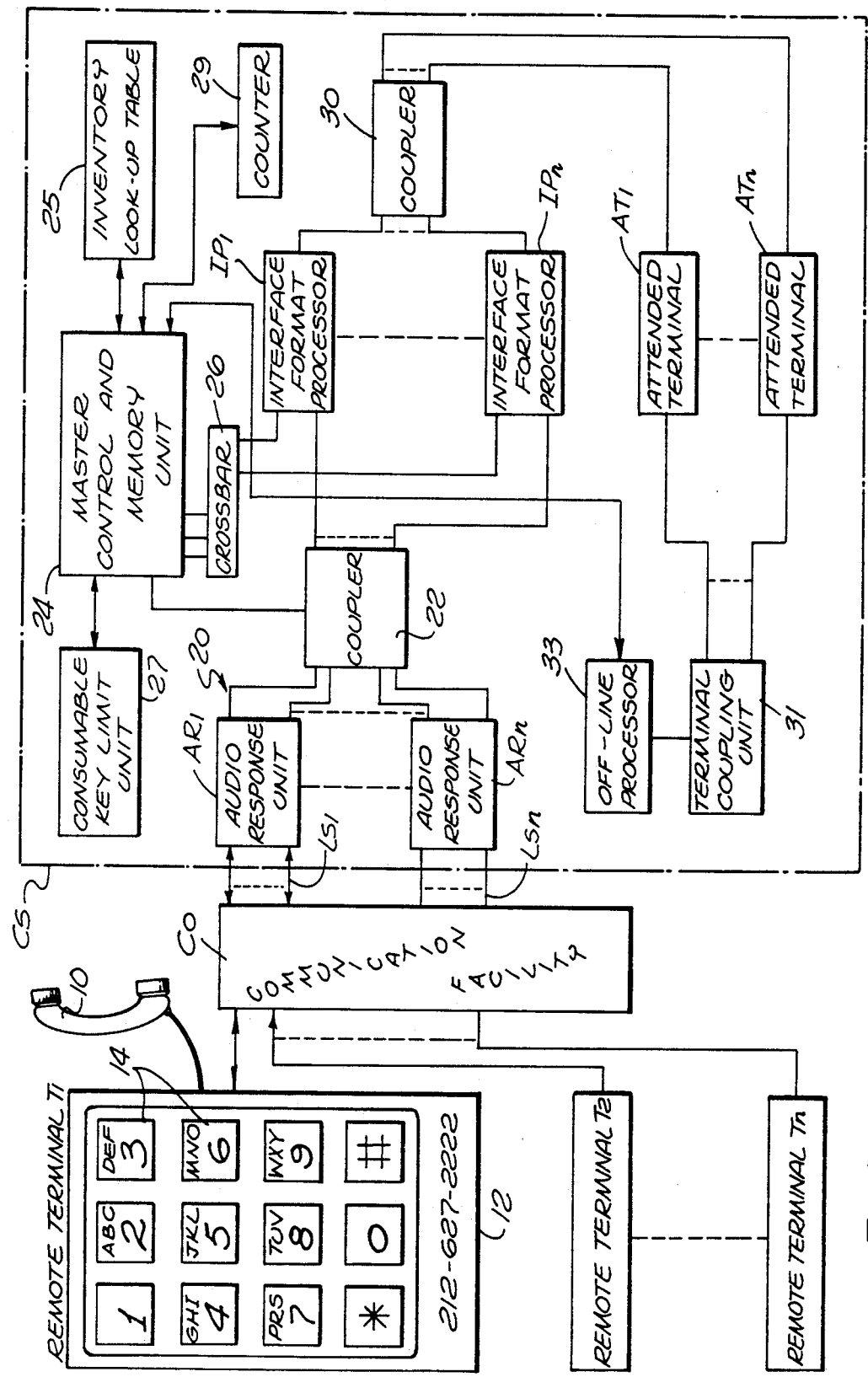
FIG. 1 is a block diagram of a system constructed in accordance with the present invention.

Referring initially to FIG. 1, a series of remote terminals T1-Tn (telephone instruments) are represented (left). The terminals T1-Tn may be similar and accordingly only the terminal T1 is shown in any detail. The indicated terminals T1-Tn represent the multitude of telephone terminals existing in association with a communication facility CO which may comprise a comprehensive public telephone network.

The communication facility CO, accommodating the individual terminals T1-Tn, is coupled to a central processing station CS generally indicated by a dashed-line block. Within the station CS as illustrated, processors are provided to interface the terminals T1-Tn so as to accomplish a desired operating format, and accordingly accumulate data relating to individual callers.

Calls to and from the terminals T1-Tn are individually processed in accordance with a specific format to accomplish a data cell or packet. For example, the objective of a call may be to order an item of merchandise to implement a mail-order operation. Similarly, a service may be specified and ordered. Accordingly, the interface accomplishes data as a cell for processing the order. In other exemplary formats, the system may function for public polls, lotteries, auctions, promotions and games.

At any instant of time, the collective interface involving the communication system CO and the processing station CS may involve several thousand calls. Accordingly, the station CS may take the form of a sizeable computer or mainframe capable of simultaneously controlling smaller units or directly operating to process many calls involving individual interfaces. Although numerous possible configurations are available, for purposes of explanation, the central station CS of the disclosed embodiment includes a control unit functioning with a plurality of audio response units and associated individual processors and attended terminals.

Essentially, the system of the present invention accumulates data from the remote terminals T1-Tn in cells, which data may include audio data and digital data (numerical) flagged or otherwise distinguished for subsequent expedient processing. Accordingly, the system enables a person at a terminal (T1-Tn) to provide data in both audio and digital forms. For audio transmissions, the person utilizes the telephone handpiece (microphone) while for digital communications, the person utilizes the telephone push buttons (keypad).

Considering the exemplary telephone terminal T1 of FIG. 1 in greater detail, a handpiece 10 (microphone and earphone) is shown along with a panel 12 provided with a rectangular array of individual push buttons 14 in a conventional configuration. Of course, the handpiece 10 accommodates analog signals while the panel 12 is a digital apparatus. As disclosed in detail below, a person is informed or cued through the handpiece 10 (earphone) to provide data in accordance with a specific format. In accordance herewith, the person may provide signals utilizing either the buttons 14 or the handpiece 10 (microphone).

In conventional telephone structures, alphabetic and numeric designations are provided on the buttons 14. For example, several of the buttons 14 carry three letters along with a decimal digit. Specifically, the button designated with the numeral "2" also carries the letters "A", "B" and "C". Thus, the buttons 14 encompass: the numerals "0-9", the symbols "*" and "#" and the alphabet except for the letters "Q" and "Z".

At this stage, some specific aspects of the communication interface are noteworthy. Essentially, by telephonic dialing, the communication facility CO is coupled selectively to certain of the terminals T1-Tn through audio response units AR1-ARn. For example, as a result of dialing a specific telephone number at one of the remote terminal units T1-Tn, the communication facility CO couples the actuated terminal through one line of several sets of lines LS1-LSn to one of the audio response units AR1-ARn. Note that automatic call distributors may be utilized as well known in the art. From the audio response units AR1-ARn, incoming lines 20 are received through a coupler 22 for communication with individual interface format processors IP-1-IPn. Note that the interface processors IP1-IPn are illustrated as separate and distinct units; however, as mentioned above, it is to be recognized that various structural processing combinations may be used, based on time sharing, parallel processing, compiler techniques, bus technologies and other well known computer techniques to accomplish the objective processing as explained in detail below. In some instances, certain of the structure and functions of the processors IP1-IPn can be variously incorporated in the units AR1-ARn. Of course, specific arrangements and configurations will likely be implemented based on available hardware and software development.

The coupler 22 is also connected to a master control and memory unit 24 which is associatively coupled to a look-up table 25, a consumable key limit unit 27, a subset counter 29 and through a crossbar 26 to each of the processors IP1-IPn. Note that both the function and structure of crossbars for selectively interconnecting multiple parallel structures are well known in the computer arts. For a detailed description of crossbars, see the book, "High-Performance Computer Architecture" by Harold S. Stone, published by Addison-Wesley Publishing Company, 1987.

The coupler 22 essentially functions as a switch as well known in the prior art to establish line couplings from one line of an audio response unit (AR1-ARn) to one of the interface processors IP1-IPn. The operation of the coupler 22 is implemented in association with the control unit 24 which may be programmed to execute control and memory functions as detailed below. Again, the division of functions between the unit 24, the units AR1-ARn and the processors IP1-IPn may vary considerably depending on available structures and techniques. The disclosed system is merely exemplary in that regard.

Generally, in a sales format, the interface processors IP1-IPn receive basic record data from the unit 24 and order data from the terminals T1-Tn. In a multiple format configuration, program data may be stored in the processors IP1-IPn or supplied from the unit 24. In any event, in accordance with a program or format, a packet of data is collected in a processor IP1-IPn during an interface. After being organized in a cell and flagged, the data packet is returned from an interface processor IP1-IPn to the unit 24 for subsequent use or processing. For outbound operation, the unit 24 functions as an automatic dialer to attain desired connections through the units AR1-ARn in accordance with stored telephone numbers.

Again, considering a sales format, typically individual data cells or packets of data are organized and returned to the unit 24 for processing which ultimately involves performing a service or instructions for shipping merchandise and billing. In some formats, during the course of interfaces with certain callers, the need may arise for person-to-person oral communication. In accordance herewith, to accommodate that need, the interface processors IP1-IPn may be individually associated through a coupler 30 with an attended terminal AT1-ATn. For processing operations as mentioned above, the terminals AT1-ATn may be connected through a coupling unit 31 to an off-line processor 33, also connected to the control and memory unit 24.

Recapitulating to some extent, the general operation of the system of FIG. 1 involves the development and maintenance of individual data packets or cells drawn from the unit 24 to the individual processors IP1-IPn during interface communications with individual remote terminals T1-Tn. In the exemplary format as treated below, each data cell manifests a merchandise order identifying specific goods, a specific customer, a shipping destination and other related data. In accordance herewith, data in individual cells may include flagged audio data. In any event, the operation of the system involves the organized accumulation of mail-order data (some of which may be audio) in the unit 24 addressable for subsequent use by the processor 33, as to implement billing and delivery of services or merchandise.

Figure 2:
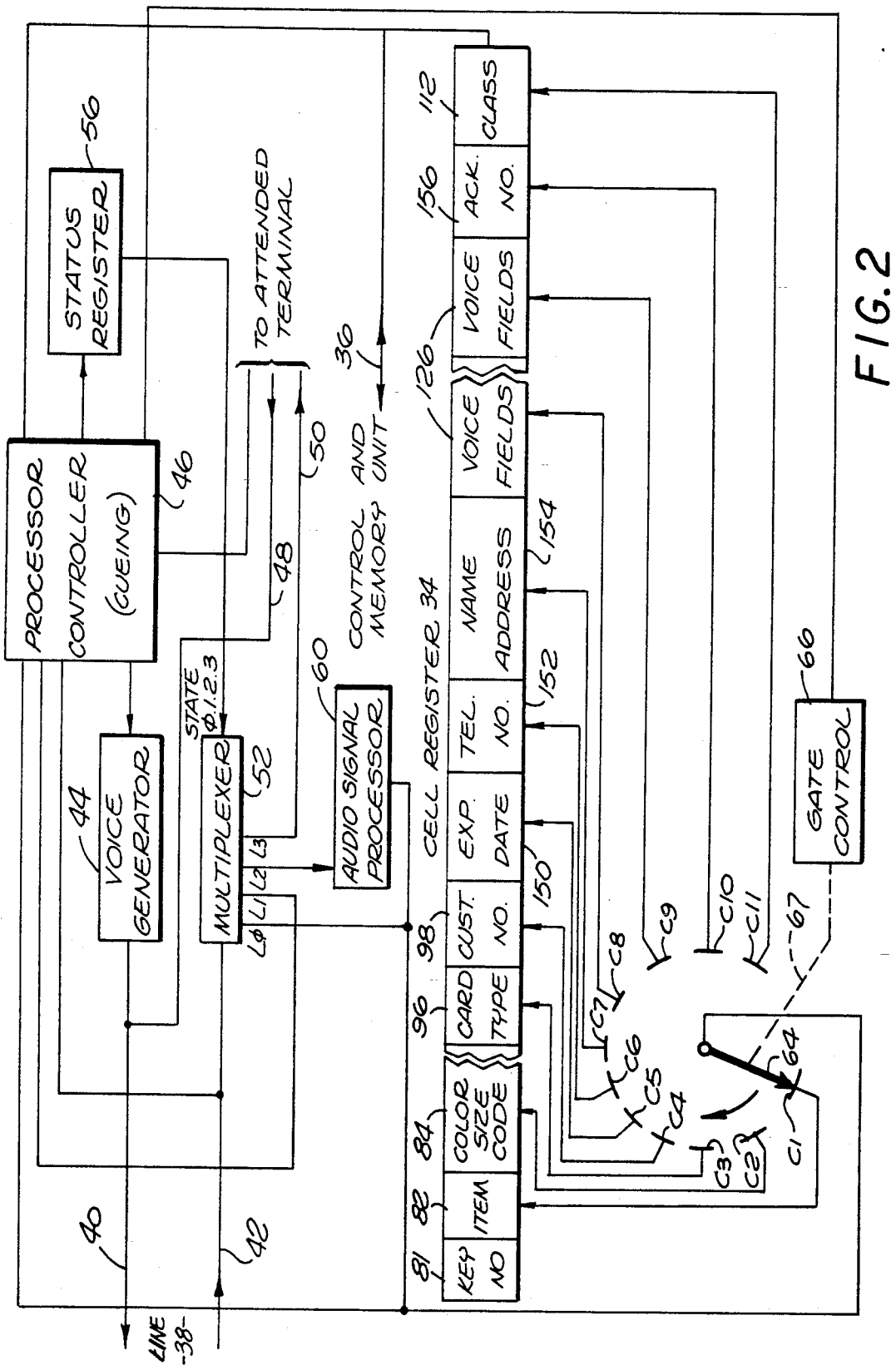
FIG. 2 is a block and schematic diagram of a component in the system of FIG. 1.

As explained in detail below, the data cells (manifesting individual orders) are developed in the individual processors IP1-IPn. Structural details of an exemplary processor are shown in FIG. 2 and will now be considered. A cell register 34 (FIG. 2, center) is divided into fields to illustrate an exemplary data format. Specifically, the cell register 34 defines several separate fields for data components manifesting an exemplary order. Record data for some of the fields may reside in the master control and memory unit 24 (FIG. 1) before the occurrence of any telephone interface. However, other fields are loaded or modified during the period of the interface with a caller at one of the remote terminals T1-Tn providing elements of the data.

Generally, variously accumulated record data is initially loaded into the cell register 34 from the control and memory unit 24 (FIG. 1) through a bus 36 (FIG. 2, right center) that is connected through the crossbar 26 (FIG. 1) to the unit 24. The same bus 36 accommodates movement of a completed or modified data cell to memory (in the unit 24).

As suggested above, some fields in the cell register 34, as those pertaining to a specific merchandise order, are always loaded by data resulting from the interface and received through a two-way line 38 (FIG. 2, upper left). That is, a caller is steered through the interface interval, being prompted or cued to provide responses selectively in the form of: (1) digital control signals, (2) digital data signals or (3) audio signals. Also, in certain applications digital ANI telephone signals may be received through the line 38 indicating the telephone dialing number of the caller. Specifically, ANI (automatic number identification) signals may be provided from the communication facility CO (FIG. 1) automatically indicating the telephone number for the calling terminal T1-Tn. The ANI signals may be treated either as control or data signals on being received through an audio response unit (AR1-ARn, FIG. 1), the coupler 22 and the line 38 (FIG. 2).

Generally, control signals in the line 38 are utilized for the controlled registration of digital data signals and audio signals as appropriate to each specific interface. Of course, the data and audio signals also are received through the line 38.

For convenience of illustration and explanation, the line 38, connected to the coupler 22 (FIG. 1) is shown to include two separate communication paths, specifically an outgoing path 40 (FIG. 2) and an incoming path 42. Of course in practice, the two paths would comprise a common two-way or bidirectional line. For outbound calls, the master control and memory unit 24 (FIG. 1) supplies dialing signals through the coupler 22 and a unit (AR1-ARn) to the facility CO. As indicated above, an automatic dialer structure is incorporated as well known in the art. On completion of a connection to a terminal T1-Tn, the unit 24 actuates a processor IP1-IPn through the crossbar 26. Thus, an addressed data packet is used to advise, inform or cue a person at a connected remote terminal (T1-Tn). In some cases, for example inbound calls, an audio response unit AR-1-ARn may perform some preliminary operations, after which calls are referred to a processor IP1-IPn through the coupler. Usually, coupling a remote terminal T1-Tn to a processor IP1-IPn initiates an interface format.

During an interface operation, as with the processor IP1 for example, the connection through the coupler 22 and the audio response unit AR1-ARn remains active. For example, the outgoing communication path 40 (FIG. 2) is provided with voice signals from a voice generator 44 that is in turn controlled by a processor controller 46. Generally, the controller 46 may possess some substantial computing capability along with storage. Accordingly, it responds to an operating program as disclosed in detail below to accomplish an interface format.

The outgoing communication path 40 of the line 38 also is connected to one of the attended terminals AT-1-ATn. The signal route in FIG. 2 is to the path 40 either from a line 48 or the voice generator 44. With respect to the incoming path 42, signals are provided through a multiplexer 52 to provide various lines L0, L1, L2 or L3 exclusively active. The line L3 or line 50 is coupled to an attended terminal AT1-ATn (FIG. 1). As indicated above and explained in detail below, under various circumstances, signals from persons at terminals are variously transferred, including transfer to an attended terminal (AT1-ATn, FIG. 1). Thus, the status of an interface may vary, one status or state designating an interconnection of one of the remote terminals T1-Tn with an attended terminal, that is, one of the terminals AT1-ATn.

The status of an interface with a caller is indicated by a status register 56 (FIG. 2, upper right) which is controlled by the process controller 46 and in turn controls the multiplexer 52. The status register 56 basically comprises a two-bit counter capable of indicating four states to control the lines L0-L3 from the multiplexer 52, as indicated below.

| State | Operation | Active Multiplexer Line |
|---|---|---|
| "0" | Cue data signals (digital) | L0 |
| "1" | Cue control signals (digital) | L1 |
| "2" | Cue audio signals | L2 |
| "3" | Actuate live interface | L3 |

The states "0", "1" and "2" indicate operations to prompt persons to provide signals digitally. Alternatively, any of the states may be used merely to inform a person where no response is to be received. As indicated above, in the state "3", the caller speaks directly with an operator to provide information in an audio form. The other states accommodate computer interface signals. Implementing the different states, the multiplexer 52 (controlled by the status register 56) selectively activates one of the four lines L0, L1, L2 or L3 to receive a specific class of signals from the path 42.

Generally, the control signals received in the line L1 are applied to actuate the controller 46. The data or information signals received in the lines L0 and L2 are provided to the cell register 34 through a gating network 62 (lower left). Several connections are involved. The line L3 is coupled to an attended terminal (AT-1-ATn, FIG. 1) through a line 50.

The line L0 (digital data) is connected to the controller 46 and to a movable contact 64 of the gating network 62. The line L1 is connected only to the controller 46. The line L2 (audio) is connected through an audio processor 60 to the controller 46 and to the movable contact 64.

The gating network 62 is illustrated in an electromechanical form for ease of explanation with the movable contact 64 displaceable to engage each of the stationary contacts C1–C11 in sequence. However, in an actual embodiment, a well known analogous solid-state configuration would be employed.

In accordance with the symbolic representation of the gating network 62, the movable contact 64 is driven by a gate control 66 to sequentially encounter stationary contacts C1–C11 which are coupled to fields of the register 34. A mechanical drive connection is indicated by a dashed line 67, the gate control 66 being actuated by the process controller 46 as described in detail below. Somewhat more specifically, the operations directed by the controller 46 are illustrated in FIG. 3 and will now be considered in detail.

Figure 3:
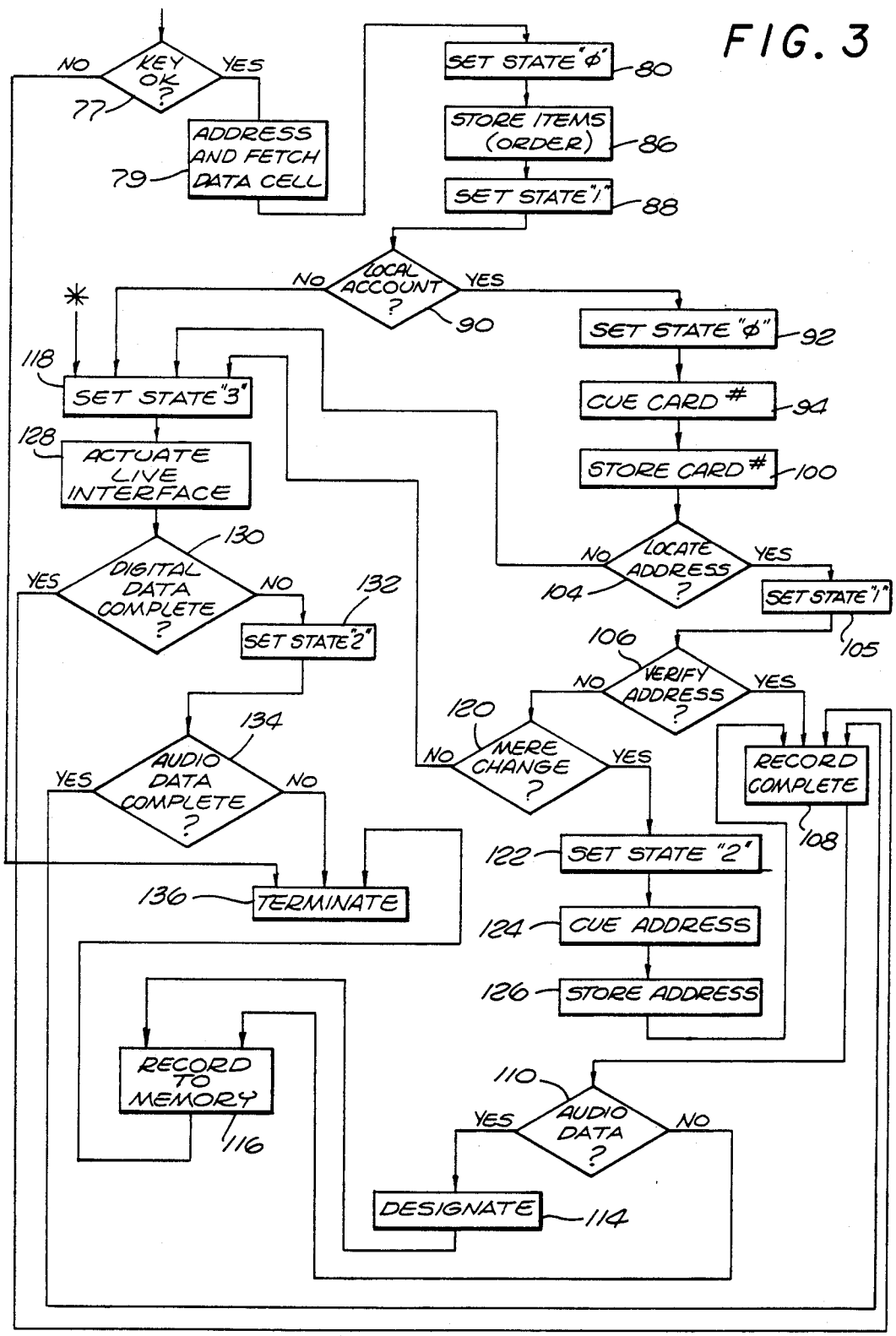
FIG. 3 is a flow diagram illustrating the operating process of the structure represented in FIG. 2.

The flow diagram of FIG. 3 implements an exemplary mail-order format for a sales organization with existing "local" customers of record (identified by telephone number, credit card number, etc.) acceptable for credit transactions. To pursue an example, customers are provided with a "special" catalog from which a single order may be placed for each telephone terminal. Thus, customers are assigned a consumable key of "one" to accordingly limit ordering.

Calls from customers are coupled through an audio response unit, e.g. unit AR1 (FIG. 1) and the coupler 22 to the master control unit 24. In one format, the customer is recognized by a telephone number manifest by automatic number identification (ANI) signals. Customer data is fetched to the consumable key limit unit 27 based on the calling telephone number. The call is then tested to proceed conditionally on the key not being previously used or consumed. The test is illustrated by a block 77 (FIG. 3) and is executed by the unit 27 with reference to a field 81 of the data packet as shown in the register 34 (FIG. 2). If there has been a previous call, the instant call is terminated as indicated. Otherwise, the data cell is fetched from the unit 24 to a cell register, e.g. register 34 (FIG. 2). The operation is indicated by the block 79 (FIG. 3). Thus, calls to a specific format number are limited to "one". Of course, consumable keys may be set to accomplish any desired limitation with respect to a specific format. Format interface operation follows approval of a call.

At the beginning of an interface operation, the processor involved, e.g. processor IP1 (FIG. 2) is set to state "0" as indicated by the block 80 (FIG. 3). That state, also indicated by the status register 56 (FIG. 2) controls the processor 46 so that a caller is cued for digital data signals to be formed by use of the buttons 14 at the caller's remote terminal. Specifically, the caller might be cued: "Please indicate your first item by keying in the three-digit catalog number." The audio is reproduced at the terminal.

As will be described in detail below, identification for an item is stored in a field 82 (FIG. 2) of the cell register 34. Similarly, color, size and code data for selected items are cued and stored in a field 84. Of course, other items may be ordered with the consequence that they are recorded in further of the fields 82 and 84 of the cell register 34. The operation also is represented by the block 86 in FIG. 3 and might be cued: "Please indicate your next item or push button '3' to indicate you are finished."

At the conclusion of the item ordering, the system sets state "1" (cue control) in the status register 56 (FIG. 2) as indicated by block 88 (FIG. 3). Note that the state "1" also may be attained by a period of silence from the caller. In any event, the subsequent operation involves a junction, as indicated by the block 90, a determination to be made by whether or not the caller is a customer of record, e.g. "local account?" As an example, the caller might be cued: "If you have a local account, please push button '1'; if not, please push button '2'." The resulting digital control signals set the course for subsequent operations as implemented by the controller 46. Of course, the indication may be confirmed or originated from the data packet.

If a caller has a local account, for example, implying that the caller's address is in the data packet, the system status is reset to state "0" (cue data) as indicated by block 92. In that event, the system resumes the accumulation of non-vocal digital data by cueing for the card number as indicated by the block 94. Note that with the indication of a local account, a designating code (customer I.D. number) is set in the field 98 of the cell register. Concurrently, the expiration date for the customer's account or card is stored in the field 150. These operations are indicated by the block 100 (FIG. 3).

Pursuing the example, the system is again set in state "1" to cue for control signals as indicated by the block 104 (FIG. 3). Specifically, as indicated by a junction block 104, a search is made for the customer's identification number. If the number is found, another control signal is cued. Specifically, as indicated by the block 106, the customer's address is verified. If the proper address is confirmed to be registered for the customer, the record is completed as indicated by the block 108. This operation, performed by the unit 46, may involve inventory verification or other internal operations as described in detail below.

Next, the system operation progresses to an internal decision block 110 to test whether or not audio data has been received. Essentially, the audio test simply queries whether or not the status register 56 has been set to manifest the existence of the states "2" or "3" to enter audio data. Control in that regard is by the controller 46 (FIG. 2).

In the example as treated to this point, neither states "2" nor "3" has occurred. However, depending on the determination, a field 112 (FIG. 2) of the cell register 34 is set with one of the two possibilities. If audio data had been entered, the block 114 would indicate a class designation of binary "1" in the field 112. Conversely, a class representative "0" is entered in the field 112 for orders involving no audio data. The operation next proceeds to record the loaded cell in memory as indicated by the block 116.

The operation as outlined to this point has covered routine orders, i.e. customers with local accounts placing orders that can be processed entirely on the basis of digital control signals and digital data signals (no audio) entered digitally as outlined above. The accommodation of other orders involving audio communication will now be considered.

Generally, audio operations involve either the introduction of a person-to-person interface, as for example for a new customer, or audio signal interface, as for example to record a new address for an existing customer. During any format operation, these operations may be actuated variously in combination with digital data control and recording. Such operations may involve proceeding through a block 118 (FIG. 3, upper left); however, other possibilities exist. One such possibility occurs when a caller indicates that his record address is not correct. Specifically in that regard, the junction block 106 (FIG. 3, right center) queries "verify address?" The cue or prompt might take the form: "According to our records, you are Mr. John Henry with a billing and shipping address of 10 Beverly, Los Angeles, Calif." A "no" response results in another test as indicated by the block 120 questioning whether or not the present situation is merely a case of an altered address. If so, the system proceeds from a "yes" determination of the block 120 to obtain an audio record of the new address. As indicated by the block 122, state "2" is set and the caller is cued to state his new address as indicated by the block 124. The address is processed by the audio processor 60 (FIG. 2) and stored as audio data as indicated by the block 126 (FIG. 3). The operation then proceeds on the basis of a complete record as indicated by the block 108. Note that in this instance audio data is registered in the cell 34 (FIG. 2) specifically in voice fields 126 with the status register 56 (FIG. 2, upper left) indicating state "2". Consequently, the junction block 110 (FIG. 3, lower right) indicates the presence of audio data with the result that the cell register 34 stores a class "1" bit to indicate the order data includes audio data.

Returning to the block 118 (FIG. 3, upper left) the operation for the case of a complex address change involves setting the operating state "3", i.e. actuating a live interface. Other patterns also may lead to that operating sequence. For example, as suggested above, patterns for a line operator interface may include a non-local account or failure to locate account data. Also, throughout the interval of an interface, a caller may prompt a direct personal contact simply by depressing the telephone button designated "*". Accordingly, as indicated in FIG. 3 at block 118, the occurrence of an asterisk signal (*) sets state "3" with operation proceeding from block 118 to activate a live interface as indicated by the block 128. The controller also may initiate state "3" as when meaningless data is received.

It is noteworthy that in an operating system, at any specific time, the demand for operators may exceed the number of operators. In that event, callers who cannot be accommodated are cued to punch in their telephone numbers and/or other data, and/or record via audio or numeric signals such data as to return calls when operators are available. The logic of such an operation is embodied in the block 128, "actuate live interface".

When a live interface is actuated involuntarily for a caller in accordance with the system as described, an incentive is offered to keep the caller on the line. Specifically, the operation involves the step represented by the block 118 (FIG. 3) "set state '3'" and the counter 29 (FIG. 1, upper right). The master control unit 24 might actuate the unit AR1 to produce an audio message at the terminal T1 as follows: "You are being transferred to a live operator. Please stay on the line as you may win a valuable prize." Immediately, the unit 24 increments the counter 29. If a specified count is attained, e.g. "1000", the caller is awarded a premium.

In the example, if the caller is the thousandth to be transferred, the unit 24 actuates the unit AR1 to produce an announcement: "You have won a $100 credit for your next order. Please stand by."

If the caller is not the one-thousandth to be transferred, as the transfer is made, the caller is informed: "Sorry, no winner, but here is our operator." Essentially, transferred calls are a subset of callers, involuntarily transferred calls are a sub-subset and winners are still another subset.

Once an operator contact has been established several possibilities exist. One possibility is that the operator completes the contents of the cell register 34 (FIG. 2) without audio data. Essentially, an operator, active at one of the attended terminals, e.g. terminal AT1 (FIG. 1) has direct control of the cell register 34 (through the controller 46, FIG. 2) along with a data display and may be able to enter digital data manifesting the order. That possibility is indicated by the junction block 130 (FIG. 2), "digital data complete?"

If the data can be completed without audio record signals, the system operation proceeds to the block 108 (record complete). If the order record is not completed void of audio data, operation proceeds in state "3". Again, under control of a live operator, the system may follow different paths to produce an ultimate determination of whether or not the audio data provides a complete order as indicated by the decision block 134. In that regard, an operator may perfect an order record on the basis of a bank credit card or a new customer accommodation. In any event, if an order is not completed, the operation simply terminates as indicated by the block 136. Conversely, a completed order returns operation to block 108 indicating the record is complete.

Exemplary operating patterns of interfaces are treated in detail below; however, after addressing individual caller data, the disclosed embodiment reproduces audio messages at the connected remote terminal. As the interface proceeds, the system cues a remote terminal, as with voice instructions to prompt: (1) digital control signals, (2) digital data signals and (3) audio signals for digital recording. Depending on the control signals, and the format, various patterns are selected with the objective of completing data in the cell register for subsequently processing the individual order. Of course, the processing generally includes data for shipping merchandise and billing the customer.

Consider now a detailed exemplary operation with the attendant operations in the structures of FIGS. 1 and 2 to accomplish the process as illustrated in FIG. 3. Preliminarily, assume the system is programmed to process orders from XYZ COMPANY for items of merchandise identified to customers as from catalog, newspaper or other advertising. Established customers of the XYZ COMPANY are identified by customer number, telephone number, name and address in the master control and memory unit 24 (FIG. 1). Assume initially that such a customer actuates the telephone terminal T1 to accomplish an interface through: the communication system CO, one of the audio response units AR1-ARn and the coupler 22 with one of the interface format processors IP1-IPn.

Note that the initial phase of an inbound call may be variously implemented. For example, call signals provided to an audio response unit AR1-ARn may include representations of the caller's number and accordingly access a file on the caller. In accordance with automated number identification equipment designated ANI embodied in the communication facility CO, the caller's number may be provided in a digital form. The master control and memory unit 24 then accesses the caller's cell accordingly to address individual caller data. As described above, the data may be tested before transfer to the cell register 34 with the interface being conditioned on the test. That is, as indicated above, a customer may be limited to a specified number of order calls with regard to a particular catalog or offer. Thus, the interface may involve several tests, one of which is preliminary to setting the addressed customer data in the register 34. An example will illustrate.

An offering may be made to potential customers regarding goods or services in limited amounts. For example, customers might be offered one or two purchases, but no more. Accordingly, the data cells for such customers would be set to allow only one or two purchases as specified. Specifically, for example, the field 81 (key number) for each potential customer key number would be set at "one". Upon the occurrence of a call by a customer, an individual associated data cell would be addressed using the caller's telephone number provided by automatic number identification (ANI) equipment. From within the master control and memory unit 24, the field 81 (key number) of the cell would be checked by the consumable key limit unit 27. If the consumable key number had been reduced to "zero" or incremented to "one" as programmed to indicate a previous call, the call would be rejected by the active audio response unit AR1-ARn. Otherwise, the call would be accepted and the consumable key number would be incremented or decremented by the unit 27.

With the acceptance of the call, the data cell would be set in a cell register of a selected interface format processor, e.g. processor IP1, register 34 (FIG. 2). The direct interface would then proceed.

Recognizing the various possibilities, assume that at the outset of the direct interface, the voice generator 44 (FIG. 2, upper left) is actuated by the process controller 46 to greet the caller. For example, the voice generator 44 might cue the caller as follows: "Thank you for calling XYZ COMPANY telephone merchandise service. Please push three buttons on your telephone to identify your first item by catalog number."

Signals representative of three decimal digits identifying an item are supplied from the line 42 (FIG. 2, upper left) to the multiplexer 52. As the status register 56 is in the "0" state, the signals pass from the multiplexer 52 through the moving contact 64 and the stationary contact C1 to be registered in field 82, "item".

In the illustrative format, the customer next is prompted to digitally enter data indicating choices of color, size, special code and so on. For receiving such data, the gate control 66 actuates the gating network 62 in synchronism with the cue to the second position so that the item data is provided through the contact C2 to the field 84. Following a similar pattern, the caller may identify several item designations which are registered in the item fields 82 and 84 of the cell register 34. Note that items are checked in relation to inventory by the controller 46 acting through the unit 24 (FIG. 1) and the associated inventory look-up table 25.

When the caller indicates entry of the last item (as by an interval of silence or a signal) the voice generator 44 is actuated by the controller 46 to complete the interface as predetermined. In one format, the process controller 46 has the caller's telephone number from an ANI communication from the facility CO which addressed the caller's data record. Various information then may be confirmed or supplemented in the register 34. Note that the system as disclosed is adaptable to accommodate: first-time callers, callers of record and callers with out-dated records. Various payment arrangements for goods or services also are available.

As an alternative, consider a format using a customer's credit card number to access the file. Initially, the operation of the controller is to cue for the method of payment. Specifically, for example, the caller might be cued: "If you wish this order billed to your XYZ COMPANY credit card, please push '1'. Otherwise, push '2'." Accordingly, with a credit card confirmation, the process controller 46 sets the card type in the field 96 advancing the process of FIG. 3 to proceed from the decision block 90.

Assuming the caller possesses a credit card of XYZ COMPANY, the voice generator 44 (FIG. 2) states a request (cues) for the number. For example: "Please use your telephone buttons to key in your card number." In synchronism with the cue, the gating network 62 and the status register 56 are set. Accordingly, signals representative of the digits forming the card number are received through the line 42 (FIG. 2, upper left), the multiplexer 52 and the line L0 to the gating network 62 (lower left). As the gate control 66 is set by the process controller 46, the movable contact 64 dwells on the stationary contact C4, and the customer's number is stored in the field 98.

As an alternative to the caller's telephone number for addressing individual data, the customer's number may be utilized. In either event, individual data cells are addressed for record data to load other fields, e.g. fields 150, 152, 154, etc. Generally, if a record for the customer's card is located in the unit 24 (FIG. 1), the information is returned via the bus 36 (FIG. 2, right center) and registered in the cell register 34. Alternatively, the data may be confirmed by the caller and entered through the gating network 62.

In the disclosed embodiment, the data includes the expiration date of the card placed in field 150, the customer's telephone number set in field 152 and the customer's name and address set in the field 154. The telephone number may be useful if a live interface is prompted or, as indicated above, it may be used as an address to locate a particular file or data.

Considering the stage-by-stage confirming operation, the location of a customer's record prompts the controller 46 (FIG. 2) to actuate the gate control 66 setting the movable contact 64 to dwell in sequence at the contacts C5, C6 and C7. With confirmation, the customer's card expiration date, telephone number and address are supplied to the fields 150, 152 and 154. For example, the customer's address is supplied from the controller 46 to the voice generator 44. Consequently, as indicated above, the caller might be prompted as follows: "According to our records, you are Mr. John Henry with a billing and shipping address of 10 Beverly, Los Angeles, Calif. If our information is correct, please push '1'; if not, please push '2'." This operation is symbolized in FIG. 3 by the block 106 (right center).

Of course, the confirmation of a customer can be broken into even smaller communications if desired. Note that in cueing the caller for confirmation, the status register 56 is set to manifest state "1" indicating that control signals are being cued. Consequently, the response from the caller is passed through the multiplexer to line L1 and then to the process controller 46.

If the caller indicates the information is correct, the process controller 46 supplies the address data of record to the field 154.

If there are no voice fields, the controller 46 actuates the gate control 66 to set the movable contact 64 at the stationary contact C10. The operation of completing the record then involves providing an acknowledgement number through the contact C10 to the field. The acknowledgement number also may be communicated to the caller by the process controller actuating the voice generator 44. Specifically, an acknowledgement number is set in the field 156 and is vocalized to the caller. Of course, as with other data from storage, it may be confirmed, e.g. "Please repeat your acknowledgement number." Note that callers in a winning or other special set or subset may be identified by coded acknowledgement numbers.

As the final step in the sequence, the movable contact 64 is actuated to engage the stationary contact C11 through which the process controller 46 supplies a signal indicative of binary "0" manifesting that the order data does not include an audio component, i.e. the voice fields 126 are blank.

With the order complete, the contents of the cell register 34 is transferred through the bus 36 to the master control and memory unit 24. As indicated above, subsequent processing may involve subsequent operations to: place related calls, fill orders and bill charges. Specifically for example, referring to FIG. 1, the manually attended terminals AT1-ATn may be actuated to control the processor 33 through the coupling unit 31. The processor 33 is operated in cooperation with the unit 24 to process individual orders. Note that the audio data stored in cells is flagged for selection as explained in detail below.

To illustrate an alternate course in the process as generally described above, assume that the customer has a valid credit card record with the XYZ COMPANY; however, the address of record is incorrect. In processing an interface with such a customer, the operation would be as described above except that the junction represented by the block 106 (FIG. 3, right center) would determine an incorrect address. Consequently, with the system in state "1", a control signal manifesting an incorrect address is supplied through the line L1 to the process controller 46 setting up an alternate operation. Specifically, the next step involves determining whether the verification failure may be corrected by a mere change of address as indicated by the block 120 (FIG. 3). To implement the operation, the process controller 46 (FIG. 2) actuates the voice generator 44 to cue the caller for control signals. For example, the cue may be stated: "If it is simply a matter of correcting or changing your address, lease push '1'. Otherwise, push '2'."

If the caller actuates the "1" button, a control signal is provided through the multiplexer 52 and the line L1 to the process controller 46 indicating a simple address correction. As a result, the process controller 46 sets the status register 56 to state "2" (see block 122, FIG. 3). As a consequence, in the system of FIG. 2, the input path 42 is coupled through the multiplexer 52 to the line L2 for supplying audio signals to the audio signal processor 60. Note that during this phase of operation, the process controller 46 actuates the gate controller 66 to set the movable contact 64 at the stationary contact C8 or C9 for recording audio data in the voice fields 126.

In the configuration as described, on cue, the oral statement of the caller's address is provided as an analog signal which may be variously transmitted through the communication facility CO (FIG. 1) to ultimately reach the line 38 (path 42) (FIG. 2, upper left). From the path 42, the representative analog signal is supplied through the multiplexer 52 and the line L2 to the audio signal processor 60 which may variously process the data and encodes the analog signals in a digital format. Accordingly, digital signals indicative of the caller's correct address are registered in the fields 126 of the cell register 34.

With the proper address stored, the customer's record is complete in the cell register 34 and the process proceeds to the operations represented by block 108 (FIG. 3, right center). Specifically, an acknowledgement number is revealed and stored in the field 156 of the cell register 34. As audio signals are involved, the field 112 registers a binary "1" indicative of that class of data cell (audio).

Note that data words stored in the cell register 34 may be variously segregated or processed based on their classification as registered in the field 112. For example, it may be desirable to segregate class "1" and class "0" orders for distinct off-line processing. In that regard, as class "0" orders have no audio data, they involve somewhat simpler process operations in that no human action is involved. Conversely, class "1" orders in the disclosed system are contemplated to involve human processing to convert spoken words to digital data.

To pursue another possible course of operation, assume that prompting or cueing a customer regarding his altered address does not involve a mere change. That is, assume the decision block 120 (FIG. 3, central) produced a control signal manifesting "no", i.e. more than a mere change is involved and a live contact interface is desirable. Upon such an occurrence, state "3" is set as indicated by the block 118 (FIG. 3). As indicated above, several other possibilities may set the operation of state "3". In any event, the status register 56 (FIG. 2) is set by the controller 46 to manifest state "3". Consequently, the status register 56 controls the multiplexer 52 actuating communication through the line L3 to the lines 48 and 50 coupled to one of the attended terminals AT1-ATn (FIG. 1).

In the configuration of state "3", the process controller 46 along with the lines 48 and 50 are linked to one of the attended terminals AT1-ATn enabling an operator to speak directly with a caller and concurrently set data into the data cell register 34 through the controller 46. Note that the attended terminals AT1-ATn include a display and, accordingly, the controller 46 cooperatively drives the display with the cell register to indicate the state of the interface and the caller's data. Thus, unconventional orders are processed with the system in state "3" as described above, the process flowing from the block 118 (FIG. 3, upper left).

Of course, numerous possibilities exist for completing an order with an attended terminal. In that regard, the contents and control of the cell register 34 is by the attended terminal and the problem may simply be one of communication in which case the order data may be completed either with or without audio data.

Recapitulating to some extent, a live interface is prompted from several situations. One case involves the caller depressing the "*" button. Also, if the caller does not have credit with the XYZ COMPANY (not a local account) a live interface is prompted. In that regard, an alternative credit card as a bank card may be employed. Accordingly, data is received in either an audio or non-audio form.

Consider a bank credit card order with reference to FIG. 2 in which the cell register 34 receives alternate information. In this situation, the field 96 may store an indication of an acceptable bank card. Specifically, fields 96, 98 and 150 respectively store a bank card type, the bank card number and the expiration date. It may be further advisable to store the caller's telephone number in field 152. The caller's name and address will be stored; and in that regard, either the field 154 may be utilized by the operator at an attended terminal or an audio record may be keyed for storage in one or more fields 126. If the order is completed by an operator, the system proceeds as explained above with the final steps of indicating an acknowledgement number and designating the class of the order. Thereafter, as in other examples, the contents of the cell register is returned to the master control and memory unit 24 (FIG. 1) for subsequent processing. Note, class "1" orders also may be stored, as in a processor IP1–IPn until completed (without audio data).

It may be seen that the system accomplishes telephonic interfaces utilizing various operations in accordance with control signals prompted by cues from a voice generator. That is, the system alternately may cue a caller to provide: digital data, control data or audio data. Concurrent with the cueing operations, the system assumes a state for compatibly processing responses. Specifically, if control signals are cued, the system is controlled accordingly. If data signals are cued, the system registers such data in either an audio or non-audio format. Furthermore, depending upon the detailed operation of the system, order data is developed as in individual cells for subsequent off-line processing. Individual packets or cells of such data are classified as disclosed above, and such classifications may be effectively utilized to segregate or perform various other processing operations.

In view of the above description, it will be apparent that the system of the present invention may be effectively used in telephonic interfaces to accommodate flexibility and control by a caller. Although the disclosed embodiment is directed to a sales operation, it will be apparent that the system may be variously embodied to accommodate any of a variety of telephonic interface operations, e.g. poll, game format, information service and so on. Furthermore, it will be apparent that while the disclosed embodiment comprises specific elements and configurations, any of a variety of structure might well be utilized. Accordingly, the scope hereof is deemed to be as set forth in the claims below.

What is claimed is:

1. A voice-data control system for use with a communication facility including remote terminals for individual callers, wherein said remote terminals may comprise a conventional telephone instrument including voice communication means for providing audio response signals and digital input means for providing digital response signals, said control system comprising:

cue means for cueing select ones of said terminals to prompt selective actuation of said voice communication means and said digital input means to provide responsive signals;

status means to selectively identify response signals from said select ones of said terminals as digital response signals or audio response signals wherein said digital response signals include digital control signals and digital data signals;

memory means for storing individual caller data;

means for addressing individual caller data from said memory means in response to digital response signals from said digital input means;

means for storing said digital data signals from said digital input means as additional individual caller data;

control means for actuating said cue means and said status means to cue and identify said audio response on the signals, operation of said control means being conditioned failure of said means for addressing individual caller data to provide signals representative of caller data from said memory means; and means for storing said audio response signals representative of caller data in said memory means responsive to cueing by said cue means.

2. A system according to claim 1 further including interface processor means for receiving said audio response signals representative of caller data and said digital response signals for processing.

3. A system according to claim 2 wherein said interface processor includes means to isolate a subset of said callers.

4. A system according to claim 1 further including consumable key test means to qualify callers with respect to limited use.

5. A system according to claim 1 wherein said communication facility provides automatic number identification (ANI) signals and said status means selectively identifies said automatic number identification signals as digital control signals or digital data signals.

6. A system according to claim 5 further including consumable key test means to qualify callers with respect to limited use and wherein said callers are identified by said automatic number identification (ANI) signals.

7. A voice-data control system for use with a communication facility including remote terminals for individual callers, wherein said remote terminals may comprise a conventional telephone instrument including voice communication means for providing audio response signals and digital input means for providing digital response signals, said control system comprising:

cue means for cueing select ones of said terminals to prompt selective actuation of said voice communication means and said digital input means to provide response signals;

status means to selectively identify responsive signals from said select ones of said terminals as digital response signals or audio response signals wherein said digital response signals include digital control signals and digital data signals;

control means implementing a stored program to control said cue means and said status means in accordance with said program and said digital control signals to prompt the provision of responsive signals from said select ones of said terminal in accordance with said status means;

means for storing responsive signals from said select terminals including digital data signals and audio response signals as selectively identified by said status means; and means for processing said digital response signals to isolate a subset of said callers.

8. A system according to claim 7 further including consumable key test means to qualify callers with respect to limited use.

9. A system according to claim 7 wherein said means for processing includes interface processor means for receiving said audio signals representative of caller data and said digital response signals for processing.

10. A system according to claim 7 further including a plurality of audio response units for interfacing said means for processing to said communication facility.

11. A system according to claim 7 wherein said communication facility provides automatic number identification (ANI) signals and said status means selectively identifies said automatic number identification signals as digital control signals or digital data signals.

12. A voice-data control system for use with a communication facility including remote terminals for individual callers, wherein said remote terminals may comprise a conventional telephone instrument including voice communication means for providing audio response signals and digital input means for providing digital response signals, said control system comprising:
- cue means for cueing select ones of said terminals to prompt selective actuation of said voice communication means and said digital input means to provide responsive signals;
- status means to selectively identify responsive signals from each select terminal as digital control signals, digital data signals or audio signals;
- control means implementing a stored program to control said cue means and said status means in accordance with said program and said digital control signals to prompt responsive signals from each select terminal in accordance with said status means, said program implementing an interface communication operation; and
- means for selectively storing responsive signals from said select terminals including digital data signals and audio signals as selectively identified by said status means to indicate identification data and process data provided by said callers.

13. A system according to claim 12 wherein said means for storing signals stores signals representative of billing information.

14. A system according to claim 13 wherein said control means further implements inventory means to account for items.

15. A system according to claim 14 wherein said inventory means includes an inventory record of said items.

16. A system according to claim 12 wherein said communication facility provides automatic number identification (ANI) signals and said status means selectively identifies said automatic number identification signals as digital control signals or digital data signals.

17. A voice-data control system for use with a communication facility including remote terminals for individual callers, wherein said remote terminals may comprise a conventional telephone instrument including voice communication means for providing audio signals and digital input means for providing digital response signals, said control system comprising:
- cue means for cueing select ones of said terminals to prompt selective operation of said voice communication means and said digital input means at said terminals to provide responsive signals;
- status means to selectively indicate responsive signals from each select terminal as digital control signals, digital data signals or audio signals;
- control means for receiving said digital control signals for actuating said cue means and said status means to cue and identify responsive signals in relation to the operation selectively prompted by said cue means; and
- means for storing and retrieving individual caller data, including said audio signals for reproducing audio caller voice data at a remote terminal.

18. A system according to claim 17 further including a plurality of audio response units for interfacing said means for processing to said communication facility.

19. A system according to claim 17 further including consumable key test means to qualify callers with respect to limited use.

20. A system according to claim 17 wherein said communication facility provides automatic number identification (ANI) signals and said status means selectively identifies said automatic number identification signals as digital control signals or digital data signals.

21. A voice-data control system for use with a communication facility including remote terminals for individual callers, wherein said remote terminals may comprise a conventional telephone instrument including voice communication means for providing audio signals and digital input means for providing digital response signals, said control system comprising:
- cue means for cueing select ones of said terminals to prompt selective operation of said voice communication means and said digital input means at said terminals to provide responsive signals;
- status means to selectively indicate responsive signals from each select terminal as digital control signals, digital data signals or audio signals;
- test means for testing caller identification data for approval;
- control means for receiving said digital control signals including automatic number identification (ANI) signals to actuate, said test means, said cue means and said status means in accordance with a predetermined program; and
- means for storing individual caller data as received under control of said control means implementing said program.

22. A voice-data control system for use with a communication facility including remote terminals for individual callers, wherein said remote terminals may comprise a conventional telephone instrument including voice communication means for providing audio response signals and digital input means for providing digital response signals, said control system comprising:
- cue means for cueing select ones of said terminals to prompt selective actuation of said voice communication means and said digital input means to provide responsive signals;
- status means to selectively identify responsive signals from each select terminal as digital control signals, digital data signals or audio signals;
- control means implementing a stored program to control said cue means and said status means in accordance with said program and said digital control signals to prompt responsive signals from each select terminal in accordance with said status means, said program implementing an order operation; and
- means for selectively storing responsive signals from said select terminals including digital data signals and audio signals as selectively identified by said status means to indicate data and orders by said callers for specific items of merchandise.

* * * * *

UNITED STATES PATENT AND TRADEMARK OFFICE
CERTIFICATE OF CORRECTION

PATENT NO. : 5,224,153
DATED : June 29, 1993
INVENTOR(S) : Ronald A. Katz

It is certified that error appears in the above-identified patent and that said Letters Patent is hereby corrected as shown below:

Column 1, line 43, change "1989" to --1988--;

Column 13, line 51, change "lease" to --please--;

Column 16, line 9, delete "on the"; and

Column 16, line 10, after "conditioned" insert --on the--.

Signed and Sealed this

Sixth Day of September, 1994

Attest:

BRUCE LEHMAN

Attesting Officer    Commissioner of Patents and Trademarks